2,693,471

HYDROXYCYCLOOCTYLAMMONIUM COMPOUNDS

Louis E. Craig, Washington, N. J., assignor to General Aniline & Film Corporation, New York, N. Y., a corporation of Delaware No Drawing. Application March 28, 1950,
Serial No. 152,505

7 Claims. (Cl. 260—294.7)

This invention relates to novel hydroxycyclooctyl quaternary nitrogen compounds, including the free bases and more particularly the salts thereof with salt-forming acids.

The compounds of this invention are quaternary nitrogen compounds containing, as one of the quaternary nitrogen substituents, a 2-hydroxycyclooctyl radical, and at least one additional monovalent, non-ionizable organic radical of a primary carbinol attached to the quaternary nitrogen atom. (By "organic radical of a primary carbinol," I mean the organic radical attached to the alcoholic OH group of the carbinol.)

A preferred class of quaternary nitrogen compounds in accordance with the invention are those which can be prepared from the 2-hydroxycyclooctyl tertiary amines of my copending application Serial No. 149,877, filed March 15, 1950, now abandoned, said quaternary compounds having the general formula:

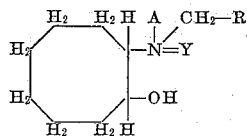

wherein A represents an anion of the class consisting of an hydroxyl group and anions of salt-forming acids (such as Cl, Br, SO$_4$, CH$_3$.COO, and the like), R—CH$_2$— represents an organic radical of a primary carbinol in which R can be, for example, hydrogen, or an alkyl, alkenyl, aralkyl, aryl or alicyclic group, and Y represents a member of the group consisting of a pair of alkyl groups of 1 to 2 carbon atoms and divalent 4- to 5-membered polymethylene (tetramethylene, pentamethylene) and dialkylene ether groups (thiodiethylene or oxydiethylene groups) which form a heterocyclic ring including the nitrogen atom. The compounds of this invention are conveniently prepared by reacting a 2-tertiary-aminocyclooctanol, preferably one having the formula:

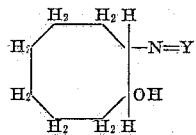

(wherein Y has the same significance as that given above), with a quaternizing agent (e. g. a reactive organic halide, sulfate or p-toluene sulfonate) of which the organic radical is the radical of a primary carbinol. Reaction occurs readily by heating a quantity of the quaternizing agent, preferably in excess of the amount theoretically required, with the 2-tertiary-aminocyclooctanol, in an inert solvent, e. g. a water-soluble monohydric alcohol such as methanol, ethanol, isopropanol, or propanol, and separating the resulting quaternary nitrogen salt from the reaction mixture. Such separation can be effected, for example, by concentrating the reaction mixture, cooling to cause crystallization of the salt, and filtering out the product. The reaction is suitably carried out by heating the aforesaid reaction mixture, preferably including one of the aforesaid diluents, at 50 to 200° C., for example, at boiling temperature under reflux, or at higher temperatures within the aforesaid range under sufficient pressure to maintain the mixture in liquid form. Purification of the product can be effected by recrystallization from an organic solvent. The corresponding free bases can be prepared from the salts obtained from the reaction mixture, by reaction with a metallic oxide or hydroxide, e. g. silver oxide or an alkali metal hydroxide, adapted to undergo metathesis with the quaternary ammonium salt.

The following example, wherein parts are by weight unless otherwise indicated, illustrate the preparation of quaternary compounds in accordance with my invention.

Example 1

A solution of 10 parts of 2-dimethylaminocyclooctanol (prepared as described in my copending application Serial No. 149,877 filed March 15, 1950) and 25 parts of methyl iodide in 60 parts of methanol, was heated at boiling temperature under reflux (65 to 70° C.) for 5 hours. The reaction mixture was concentrated by distillation to about one-third of its volume, and the resulting solution cooled. The product which thereby separated from the solution was recovered by filtration, and washed with anhydrous diethyl ether. An additional quantity of the reaction product was recovered by adding diethyl ether to the mother liquor and filtering out the resulting precipitate. 13.3 parts (73% of theory) of 2-hydroxycyclooctyl trimethylammonium iodide were recovered in this manner. From ether and methanol, on recrystallization, 12 parts of a purified product were obtained in the form of colorless needles having a melting point of 214 to 215° C.

Elementary analysis of the product yielded the following results. Found: C, 42.51%; H, 7.87%; N, 4.66%. Calculated for C$_{11}$H$_{24}$INO: C, 42.18%; H, 7.72%; N, 4.47%.

Example 2

A solution of 25 parts of 2-dimethylamino cyclooctanol and 25 parts of dimethyl sulfate in about 20 parts of ethanol was heated at reflux (ca. 80° C.) for 5 hours. The residue obtained by evaporation of the ethanol and excess dimethyl sulfate under reduced pressure was recrystallized from an ethanol-diethyl ether mixture, yielding crystalline trimethyl-2-hydroxycyclooctylammonium methosulfate, having a melting point of 97 to 100° C. An elementary analysis gave the following results. Found: C, 48.38%; H, 9.00%; N, 4.55%. Calculated for C$_{16}$H$_{27}$NOS: C, 48.48%; H, 9.09%; N, 4.71%.

Example 3

A solution of 10 parts of 2-dimethylamino cyclooctanol and 20 parts of benzyl bromide in about 150 parts of methanol was heated at boiling temperature under reflux for 3 hours. Addition of diethyl ether, followed by cooling, caused precipitation of the benzyl-dimethyl-2-hydroxycyclooctylammonium bromide (11 parts, 55% of theory), having a melting point of 200° C. An elementary analysis gave the following results. Found: C, 59.07%; H, 8.28%; N, 3.91%. Calculated for C$_{17}$H$_{28}$BrNO: C, 59.6%; H, 8.24%; N, 4.09%.

Example 4

2-piperidino cyclooctanol and an excess of methyl iodide were heated to boiling under reflux in methanol for 4 hours. Removal of the methanol by distillation, and recrystallization of the residue from an alcohol-diethyl ether mixture yielded crystalline methyl-2-hydroxycyclooctyl-piperidinium iodide, having a melting point of 170 to 172° C. An elementary analysis gave the following results. Found: C, 47.65%; H, 8.10%; N, 3.87%. Calculated for C$_{14}$H$_{28}$INO: C, 47.59%; H, 7.93%; N, 3.97%.

Example 5

A solution of 25 parts 2-piperidino cyclooctanol and 26 parts of benzyl bromide in about 200 parts of methanol was heated to boiling under reflux for 5 hours and the product isolated as in the preceding examples. 30 parts of benzyl-2-hydroxycyclooctyl-piperidinium bromide, representing 66% of theory, was obtained, having a melting point of 230 to 232° C.

Example 6

5 parts of 2-dimethylamino cyclooctanol, 9 parts of butyl bromide and 10 parts of ethanol were heated in a sealed tube at 150° C. for 6 hours. The addition of diethyl ether to the solution caused separation of butyl-dimethyl-2-hydroxycyclooctylammonium bromide as a dark tacky, glass-like material. After dissolving in ethanol, treating with decolorizing charcoal and adding ether, 8 parts of (88% of theory) the colorless glass-like product was obtained.

Example 7

5 parts of 2-dimethylamino cyclooctanol, 9 parts of dodecyl bromide and 10 parts of ethanol were headed in a sealed tube at 150° C. for 6 hours. Using the procedure as described in Example 6, the dodecyl-dimethyl-2-hydroxycyclooctylammonium bromide was obtained as a light tan, viscous syrup (9.6 parts, 79% of theory).

In the foregoing examples, other 2-hydroxycyclooctyl tertiary amines can be used instead of 2-dimethylamino cyclooctanol and 2-piperidino-cyclooctanol specified above. Such compounds include, for example, 2-pyrrolidino-, 2-morpholino- and 2-thiomorpholino-cyclooctanol, 2-diethylamino cyclooctanol and 2-methylethylamino cyclooctanol. Similarly, instead of the quarternizing agents employed in the examples, there can be used ethyl iodide, allyl iodide, octadecyl bromide, benzyl-p-toluene sulfonate, diethyl sulfate, and the like.

The resulting quaternary ammonium salts can be converted to the corresponding free by metathesis with appropriate metal oxides or hydroxides such as silver oxide, sodium hydroxide, potassium hydroxide and the like. Salts of other inorganic and organic acids can be prepared from the resulting free bases by neutralizing the free base with a desired salt-forming acid.

The products are valuable as pharmaceutical intermediates, particularly in the preparation of sympathomimetics and analogs of choline derivatives having muscarinic, nicotinic, atropinic and curariform action.

Variations and modifications which will be obvious to those skilled in the art can be made in the foregoing processes and materials without departing from the scope or spirit of the invention.

I claim:
1. A quaternary nitrogen compound having the general formula:

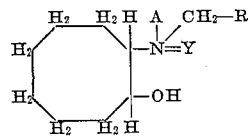

wherein A represents an anion of a salt-forming acid, R represents a member of the group consisting of hydrogen, alkyl, vinyl and phenyl radicals, and N=Y represents a radical of the class consisting of lower dialkylamino, piperidino, pyrrolidino, morpholino and thiomorpholino radicals.

2. A quaternary nitrogen compound having the general formula:

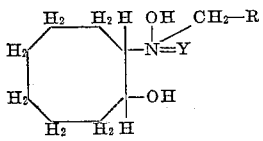

wherein R represents a member of the group consisting of hydrogen, alkyl, vinyl and phenyl radicals, and N=Y represents a radical of the class consisting of lower dialkylamino, piperidino, pyrrolidino, morpholino and thiomorpholino radicals.

3. A quaternary ammonium salt having the following formula:

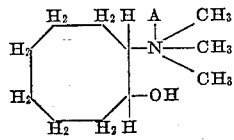

wherein A is the anion of a salt-forming acid.

4. A quaternary ammonium salt having the following formula:

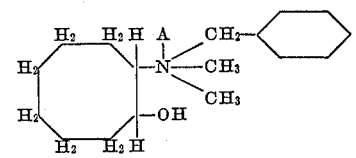

wherein A is the anion of a salt-forming acid.

5. A quaternary ammonium salt having the following formula:

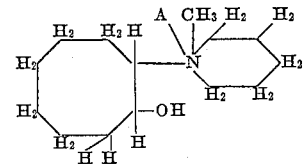

wherein A is the anion of a salt-forming acid.

6. A quaternary ammonium salt having the following formula:

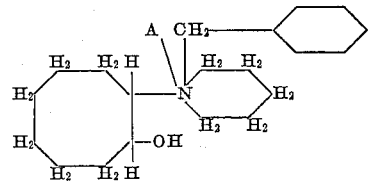

wherein A is the anion of a salt-forming acid.

7. A quaternary ammonium salt having the following formula:

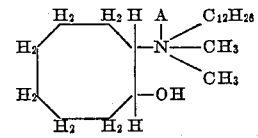

wherein A is the anion of a salt-forming acid.

References Cited in the file of this patent

UNITED STATES PATENTS

| Number | Name | Date |
|---|---|---|
| 2,218,739 | Bruson | Oct. 22, 1940 |
| 2,474,426 | Kendall et al. | June 28, 1949 |
| 2,508,422 | Rieveschl | May 23, 1950 |
| 2,527,962 | Rieveschl | Oct. 31, 1950 |
| 2,527,963 | Rieveschl | Oct. 31, 1950 |
| 2,537,988 | Goodman et al. | Jan. 16, 1951 |
| 2,537,993 | Gump et al. | Jan. 16, 1951 |
| 2,537,994 | Gump et al. | Jan. 16, 1951 |

FOREIGN PATENTS

| Number | Country | Date |
|---|---|---|
| 194,642 | Switzerland | Mar. 16, 1938 |

OTHER REFERENCES

Mousseron, Chem. Abstr., vol. 26 (1932) page 5567.
Godchot et al., Chem. Abstr., vol. 27 (1933) pp. 4529–30.
Mousseron et al., Chem. Abstr., vol. 42 (1948) pp. 3377–9.